United States Patent
Fang et al.

(10) Patent No.: US 10,429,679 B2
(45) Date of Patent: Oct. 1, 2019

(54) DISPLAY DEVICE

(71) Applicant: Coretronic Corporation, Hsin-Chu (TW)

(72) Inventors: Chong-Yang Fang, Hsin-Chu (TW); Wen-Chun Wang, Hsin-Chu (TW); Hsiung-Chun Hsu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 6 days.

(21) Appl. No.: 15/850,963

(22) Filed: Dec. 21, 2017

(65) Prior Publication Data

US 2018/0188603 A1 Jul. 5, 2018

(30) Foreign Application Priority Data

Dec. 29, 2016 (TW) ............... 105143852 A

(51) Int. Cl.
G02F 1/13 (2006.01)
G02F 1/1334 (2006.01)
G02F 1/1335 (2006.01)

(52) U.S. Cl.
CPC .......... G02F 1/1323 (2013.01); G02F 1/1334 (2013.01); G02F 1/133504 (2013.01);
(Continued)

(58) Field of Classification Search
CPC ......... G02F 1/133602; G02F 1/133528; G02F 1/133504; G02F 1/1323; G02F 1/1334;
(Continued)

(56) References Cited

U.S. PATENT DOCUMENTS 4,688,900 A * 8/1987 Doane ............... C09K 19/00
  349/20
5,301,046 A * 4/1994 Konuma ............... G02F 1/1334
  349/89
(Continued)

FOREIGN PATENT DOCUMENTS

CN 1702517 A 11/2005
CN 1708704 A 12/2005
(Continued)

OTHER PUBLICATIONS

Hisatake et al, "31.3: Viewing Angle Controllable LCD using Variable Optical Compensator and Variable Diffuser", SID 05 Digest, May 2005, pp. 1218-1221.
(Continued)

*Primary Examiner* — Shan Liu

(57) ABSTRACT

A display device includes a backlight module generating an emitting light having a first light distribution pattern, a switchable single-axis diffuser and a display panel. The first light distribution pattern has a light intensity exceeding a predetermined value within a first view angle range in a first direction. When the switchable single-axis diffuser is switched to a transparent mode, the emitting light passes through the switchable single-axis diffuser and maintains the first light distribution pattern. When the switchable single-axis diffuser is switched to a diffusion mode, the emitting light passes through the switchable single-axis diffuser and converts to a second light distribution pattern having the luminous intensity exceeding the predetermined value within a range of a second view angle in a first direction. The second view angle range is larger than the first view angle range.

12 Claims, 12 Drawing Sheets

(52) U.S. Cl.
CPC .. *G02F 1/133528* (2013.01); *G02F 1/133602* (2013.01); *G02F 1/133509* (2013.01); *G02F 2001/133626* (2013.01)

(58) Field of Classification Search
CPC ... G02F 1/133509; G02F 2001/133626; G02F 1/1336; G02F 1/13338; G02F 1/134309; G02F 1/13439; G02F 1/1393; G02F 2203/50; G02F 2001/294; G02F 1/133526; G02F 2001/13793; G02B 6/005; G02B 6/0051; G09G 2320/068
See application file for complete search history.

(56) References Cited

U.S. PATENT DOCUMENTS

| | | | |
|---|---|---|---|
| 7,267,849 B2 | 9/2007 | Lazarev et al. | |
| 7,880,843 B2 | 2/2011 | Morishita et al. | |
| 2002/0130989 A1* | 9/2002 | Nakao | G02F 1/1334 349/86 |
| 2005/0206814 A1 | 9/2005 | Histake | |
| 2006/0103782 A1* | 5/2006 | Adachi | G02F 1/1323 349/96 |
| 2007/0188686 A1* | 8/2007 | Yano | G02B 27/281 349/119 |
| 2007/0236939 A1 | 10/2007 | Ouderkirk et al. | |
| 2009/0015540 A1* | 1/2009 | Suzuki | G02F 1/1334 345/102 |
| 2009/0174843 A1 | 7/2009 | Sakai et al. | |
| 2010/0026946 A1 | 2/2010 | Iwamoto | |
| 2010/0149459 A1* | 6/2010 | Yabuta | G02F 1/133528 349/74 |
| 2010/0265435 A1* | 10/2010 | Hwang | G02F 1/1323 349/64 |
| 2010/0289989 A1* | 11/2010 | Adachi | G02F 1/1323 349/99 |
| 2011/0043736 A1 | 2/2011 | Liu | |
| 2011/0309398 A1 | 12/2011 | Ito et al. | |
| 2015/0208537 A1 | 7/2015 | Cho et al. | |
| 2015/0277012 A1 | 10/2015 | Nakamura et al. | |
| 2015/0346532 A1 | 12/2015 | Do et al. | |
| 2016/0356943 A1* | 12/2016 | Choi | G02F 1/1323 |
| 2017/0116937 A1 | 4/2017 | Du et al. | |
| 2017/0213874 A1 | 7/2017 | Liu et al. | |
| 2017/0219859 A1 | 8/2017 | Christophy et al. | |
| 2017/0343715 A1 | 11/2017 | Fang et al. | |
| 2018/0113334 A1 | 4/2018 | Fang et al. | |
| 2018/0321553 A1 | 11/2018 | Robinson et al. | |
| 2018/0335656 A1* | 11/2018 | Chen | G02F 1/1334 |

FOREIGN PATENT DOCUMENTS

| | | |
|---|---|---|
| CN | 101473168 A | 7/2009 |
| CN | 101661190 A | 3/2010 |
| CN | 101681061 A | 3/2010 |
| CN | 101414022 B | 10/2010 |
| CN | 202141874 U | 2/2012 |
| CN | 105807485 A | 7/2016 |
| EP | 0918247 A2 | 5/1999 |
| EP | 1536269 A1 | 6/2005 |
| EP | 2051134 A1 | 4/2009 |
| JP | P2002055341 A | 2/2002 |
| JP | 2004-206130 A | 7/2004 |
| JP | 2008003450 A | 1/2008 |
| JP | 2008096458 A | 4/2008 |
| JP | 2009522601 A | 6/2009 |
| JP | P4369222 B2 | 11/2009 |
| JP | P2011002596 A | 1/2011 |
| JP | 2011-508270 A | 3/2011 |
| TW | 200630651 A | 9/2006 |
| TW | I274918 B | 3/2007 |
| TW | 200714943 A | 4/2007 |
| TW | 200730935 A | 8/2007 |
| TW | 200807083 A | 2/2008 |
| TW | 200903053 A | 1/2009 |
| TW | I309312 B | 5/2009 |
| TW | 201031969 A1 | 9/2010 |
| TW | I356937 B | 1/2012 |
| TW | I364564 B | 5/2012 |
| TW | I412578 B | 10/2013 |
| TW | M537663 U | 3/2017 |
| WO | 2012090769 A1 | 7/2012 |
| WO | 2016195786 A1 | 12/2016 |
| WO | 2017061768 A1 | 4/2017 |
| WO | 2018221413 A1 | 12/2018 |

OTHER PUBLICATIONS

Jinbi Leng et al.,"Viewing angle changeable display", Proc. SPIE 7658, 5th International Symposium on Advanced Optical Manufacturing and Testing Technologies: Optoelectronic Materials and Devices for Detector, Imager, Display, and Energy Conversion Technology, 765816 (Oct. 22, 2010), Dalian, China; doi: 10.1117/12.867731.

* cited by examiner

DISPLAY DEVICE

CROSS-REFERENCE TO RELATED APPLICATION

This application claims the priority benefit of TW 105143852, filed on Dec. 29, 2016. The entirety of the above-mentioned patent application is hereby incorporated by reference herein and made a part of this specification.

FIELD OF THE INVENTION

The present invention relates to a display device, and more particularly to a display device capable of switching view angle thereof.

BACKGROUND OF THE INVENTION

A conventional display device, such as a mobile phone or a display device equipped in a tablet, has relatively insufficient brightness due to strong external light when it is used outdoors, so that displayed images often have poor contrast, and users can not view the images very well. The existing solution is to equip more light sources of the backlight module or use a higher current to drive the backlight module. If more light sources are used, manufacture cost will increase, and more electrical power is also consumed. If a higher current is used to drive the light source, the service life of the light source is reduced, and it also consumes more electrical power.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The present invention provides a display device capable of changing a view angle thereof. A backlight module of the display device provides a light distribution pattern having a narrower view angle and higher luminous intensity for a user clearly viewing images displayed by the display device when the display device is used outdoors or in an environment of strong external light. In contrast, the backlight module of the display device provides a light distribution pattern having a wider view angle and lower luminous intensity for a user clearly viewing images displayed by the display device within a wider view angle range when the display device is used indoors or in an environment of weak external light.

Other advantages and objects of the invention may be further illustrated by the technical features broadly embodied and described as follows.

In order to achieve one or a portion of or all of the objects or other objects, an embodiment of the invention provides a display device. The display device includes a backlight module, a switchable single-axis diffuser and a display panel. The backlight module is configured to generate an emitting light having a first light distribution pattern which has a luminous intensity exceeding a predetermined value within a first view angle range in a first direction. The switchable single-axis diffuser is disposed on the backlight module and switchable between a transparent mode and a diffusion mode, wherein the emitting light passing through the switchable single-axis diffuser has a diffusion angle in the first direction greater than diffusion angles in other directions when the switchable single-axis diffuser is switched to the diffusion mode. The display panel is disposed on the switchable single-axis diffuser, wherein the emitting light passes through the switchable single-axis diffuser and the display panel to generate an image, the emitting light passes through the switchable single-axis diffuser and is maintained to the first light distribution pattern when the switchable single-axis diffuser is switched to the transparent mode, the emitting light passes through the switchable single-axis diffuser and is diffused to have a second light distribution pattern which has a luminous intensity exceeding the predetermined value within a second view angle range in the first direction, and the second view angle range is wider than the first view angle range.

The display device of the present invention utilizes the backlight light of condensation type and the switchable single-axis diffuser which is switched between the transparent mode and the diffusion mode to adjust the scattering angle of the emitting light from the backlight module. In an environment of strong external light, the switchable single-axis diffuser is switched to the transparent mode to concentrate the emitting light in a view angle range to obtain a higher luminous intensity and display images clearly. In an environment of a weak external light, the switchable single-axis diffuser is switched to the diffusion mode to reduce the luminous intensity of the viewing angle range for avoiding the user discomfort by over-bright and raise the luminous intensity of outside of the viewing angle range for viewing clearly images within wider view angle range. Therefore, it is not necessary to add additional light sources or increase the current driving light sources for the display device of the present invention. The switchable single-axis diffuser is used to response the external light and adjusts the luminous intensity of the display device.

In addition, the display device further includes the semi-transparent view-angle-limiting filter reducing the luminous intensity to a preset value beyond a predetermined view angle range. The semi-transparent view-angle-limiting filter cooperates with the switchable single-axis diffuser switched between transparent mode and the diffusion mode to provide privacy protection function for the display device and switch between the privacy protection and the public mode.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
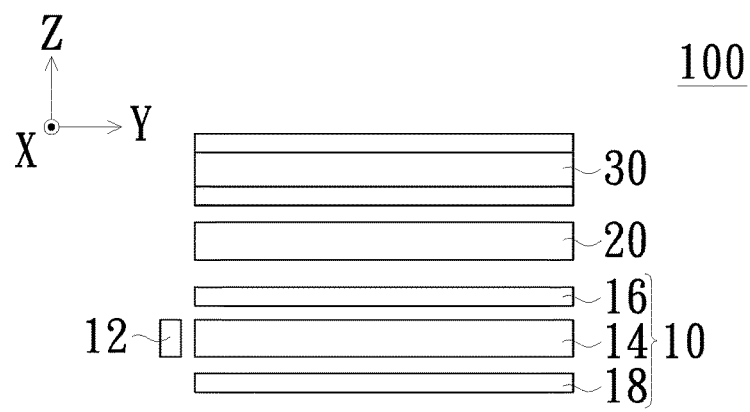
FIG. 1 is a schematic diagram of an embodiment of a display device of the present invention.
Figure 2:
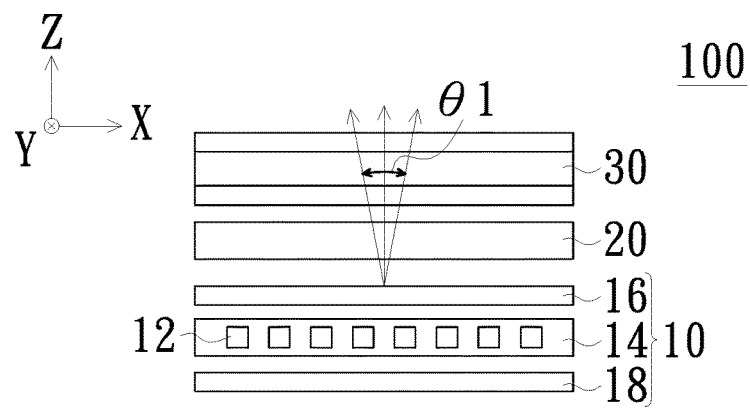
FIG. 2 is a schematic diagram of an optical path of the display device of FIG. 1 viewed from X-Z plane when a switchable single-axis diffuser is switched to a transparent mode.

Referring to FIGS. 1 and 2, an embodiment of a display device of the present invention is disclosed. FIG. 1 is a schematic diagram of the display device of the present invention viewed from Y-Z plane, and FIG. 2 is a schematic diagram of the display device of the present invention viewed from X-Z plane. The display device 100 of the present invention includes a backlight module 10, a switchable single-axis diffuser 20 and display panel 30.

Figure 4:
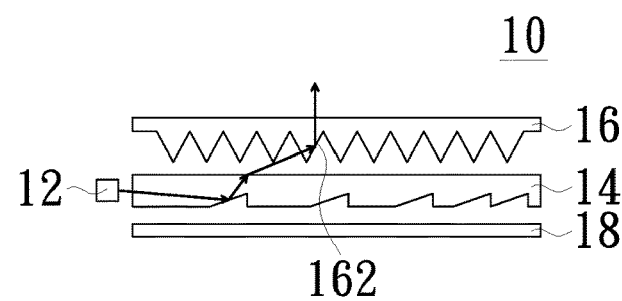
FIG. 4 is a schematic diagram of a backlight module of the display device of FIG. 1.

Referring to FIGS. 1, 2 and 4, FIG. 4 is a schematic diagram of a backlight module of the display device of FIG. 1. The backlight module 10 is configured to generate emitting light. The backlight module 10 includes a light emitting member 12, a light guide plate 14 and a brightness enhancement film 16. The light guide plate 14 has a light incident surface and a light exiting surface. In this embodiment, the light exiting from the light exiting surface is a planar light. The light emitting member 12 is adjacent to the light incident surface of the light guide plate 14 and configured to generate emitting light. The brightness enhancement film 16 is disposed on the light guide plate 14. The light generated by the light emitting member 12 enters the light guide plate 14 through the light incident surface. The light is guided by the light guide plate 14 to exit the light guide plate 14 through the light exiting surface. The light exits the light guide plate 14 and passes through the brightness enhancement film 16 to generate emitting light. The emitting light has a first light distribution pattern. The first light distribution pattern has a luminous intensity exceeding a predetermined value within a first view angle range θ1 in a first direction (in this embodiment, X direction is the first direction and hereinafter the first direction is parallel to the X direction). In this embodiment, the light emitting member 12 is a light tube or an LED array. Light generated by the light emitting member 12 enters the light guide plate 14, and the light is guided by the light guide plate 14 and exits the light guide plate 14 through the light exiting surface. The light guide plate 14 has a plurality of microstructures on a bottom thereof. When light travels to the microstructures, the microstructures reflects light and enable the light to enter the brightness enhancement film 16 at an predetermined angle. The brightness enhancement film 16 includes a plurality of inverse prisms 162 (as shown in FIG. 4). After light passes through the inverse prisms 162, light exits the brightness enhancement film 16 and has a light concentration effect. In this embodiment, the predetermined value is 50% of the maximal value of luminous intensity of the emitting light, and thus the first light distribution pattern has luminous intensity exceeding the 50% of the maximal value of luminous intensity of the emitting light within the first view angle range θ1. In this embodiment, the first view angle range θ1 is ±20°, and therefore the luminous intensity is 50% of the maximal value of luminous intensity of the emitting light at the view angle of ±20°. The backlight module 10 further includes a reflective sheet 18 disposed beneath the light guide plate 14.

The switchable single-axis diffuser 20 is disposed on the backlight module 10 and switchable between a transparent mode and a diffusion mode. When the switchable single-axis diffuser 20 is switched to the diffusion mode, the switchable single-axis diffuser 20 provides a diffusion angle in the first direction greater than the diffusion angles in other directions. The display panel 30 is disposed on the switchable single-axis diffuser 20. The emitting light generated by the backlight module 10 passes through the switchable single-axis diffuser 20 and the display panel 30 sequentially to generate images. FIG. 2 is a schematic diagram of the display device of the present invention viewed from X-Z plane when a switchable single-axis diffuser is switched to a transparent mode. When the switchable single-axis diffuser 20 is switched to the transparent mode, after the emitting light of the backlight module 10 passes through the switchable single-axis diffuser 20, the emitting light is maintained to the first light distribution pattern and has the luminous intensity exceeding the predetermined value within the first view angle range θ1.

Figure 3A:
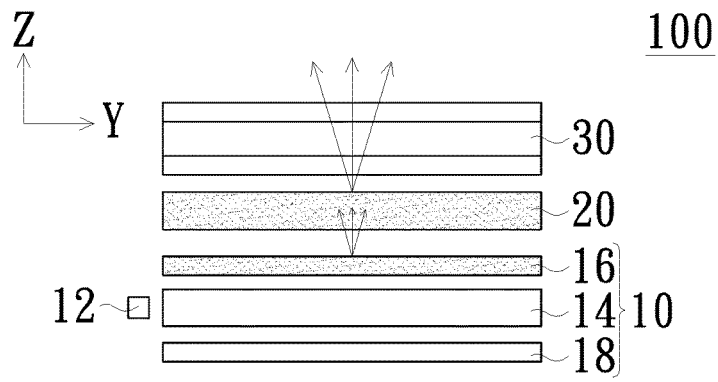
FIG. 3A is a schematic diagram of an optical path of the display device of FIG. 1 viewed from Y-Z plane when a switchable single-axis diffuser is switched to a diffusion mode.
Figure 3B:
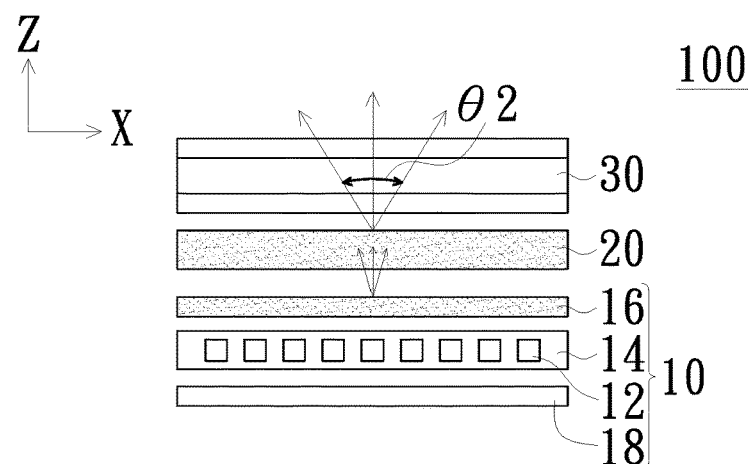
FIG. 3B is a schematic diagram of an optical path of the display device of FIG. 1 viewed from X-Z plane when a switchable single-axis diffuser is switched to a diffusion mode.

Referring to FIGS. 3A and 3B, FIG. 3A is a schematic diagram of an optical path of the display device of FIG. 1 viewed from Y-Z plane when a switchable single-axis diffuser is switched to a diffusion mode, and FIG. 3B is a schematic diagram of an optical path of the display device of FIG. 1 viewed from X-Z plane when a switchable single-axis diffuser is switched to a diffusion mode. When the switchable single-axis diffuser 20 is switched to the diffusion mode, the emitting light passing through the switchable single-axis diffuser 20 is diffused to have a second light distribution pattern. The second light distribution pattern has a luminous intensity exceeding the predetermined value with in the second view angle range θ2 in the first direction. The second view angle range θ2 is wider than the first view angle θ1. The visible range of the second light distribution pattern is wider than the visible range of the first light distribution pattern. In this embodiment, the predetermined value is 50% of the maximal value of luminous intensity of the emitting light, and the second light distribution pattern has luminous intensity exceeding 50% of the maximal value of luminous intensity of the emitting light within the second view angle range.

Comparing FIG. 3A with FIG. 3B, when the switchable single-axis diffuser 20 is switched to the diffusion mode, the emitting light having the first light distribution pattern is diffused in all directions, wherein the diffusion angle in the first direction is greater than the diffusion angles in other directions. When it is applied to a real display device, the view angle in the first direction is wider than the view angles in other directions. For example, the display device has a wider view angle in the crosswise direction than a view angle in the vertical direction because the view angle in the crosswise direction is more important than the view angle in the vertical direction for a user. In this embodiment, since the emitting light of the backlight module 10 passing through the switchable single-axis diffuser 20 of the diffusion mode is diffused, the second view angle range θ2 is wider than first view angle range θ1. When the switchable single-axis diffuser 20 is switched to the diffusion mode, the visible range is increased but average luminous intensity is reduced because the emitting light is distributed in a wider range. Therefore, in the environments of weak external light or indoors, the luminous intensity is reduced in the specific view angle range through switching the switchable single-axis diffuser 20 to the diffusion mode for avoiding the user discomfort by over-bright and raise the luminous intensity of outside of the viewing angle range for enlarging the view angle range. Compared with other typical diffusers which has substantially identical diffusion angle in all directions, the switchable single-axis diffuser of the embodiment provides a wider diffusion angle in the first direction than the diffusion angles in other directions so as to concentrate luminous intensity in other directions to the normal direction. Therefore, the switchable single-axis diffuser of the embodiment provides a higher luminous intensity in the normal direction compared with other typical diffusers. In addition, since all light is diffused to the first direction, it provides a higher luminous intensity in the first direction.

Figure 5:
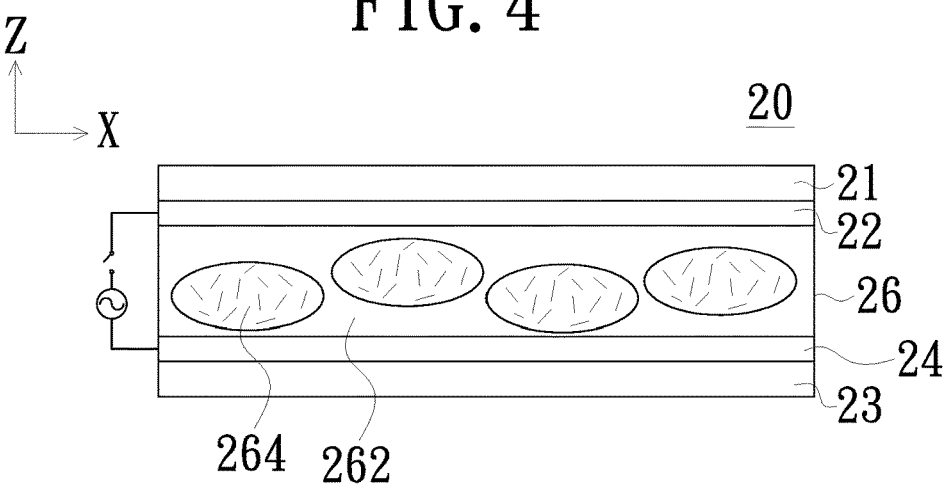
FIG. 5 is a schematic diagram of a switchable single-axis diffuser of the display device of FIG. 1.

Referring to FIG. 5, FIG. 5 is a schematic diagram of a switchable single-axis diffuser of the display device of FIG. 1. The switchable single-axis diffuser 20 includes a first transparent conductive layer 22, a second transparent conductive layer 24 and a polymer dispersed liquid crystal layer 26. The polymer dispersed liquid crystal layer 26 is sandwiched between the first transparent conductive layer 22 and the second transparent conductive layer 24. The switchable single-axis diffuser 20 further includes a first transparent substrate 21 and a second transparent substrate 23. The first transparent substrate 21 is disposed on the first transparent conductive layer 22, and the second transparent substrate 23 is disposed on the second transparent conductive layer 24. The polymer dispersed liquid crystal layer 26 includes a polymer substrate 262 and a plurality of liquid crystal droplets 264 disposed in the polymer substrate 262. The shape of each of the liquid crystal droplets 264 is ellipsoid, and each liquid crystal droplet 264 has a long axis corresponding to the first direction.

Figure 6A:
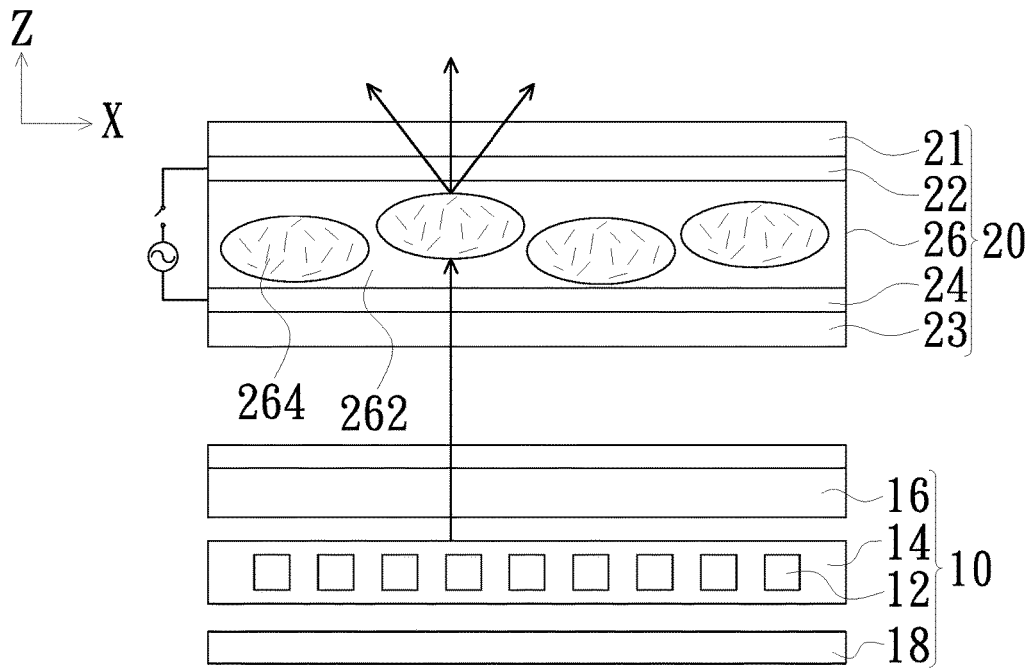
FIG. 6A is a schematic diagram of an optical path of the display device of FIG. 1 viewed from X-Z plane when a switchable single-axis diffuser is switched to a diffusion mode.
Figure 6B:
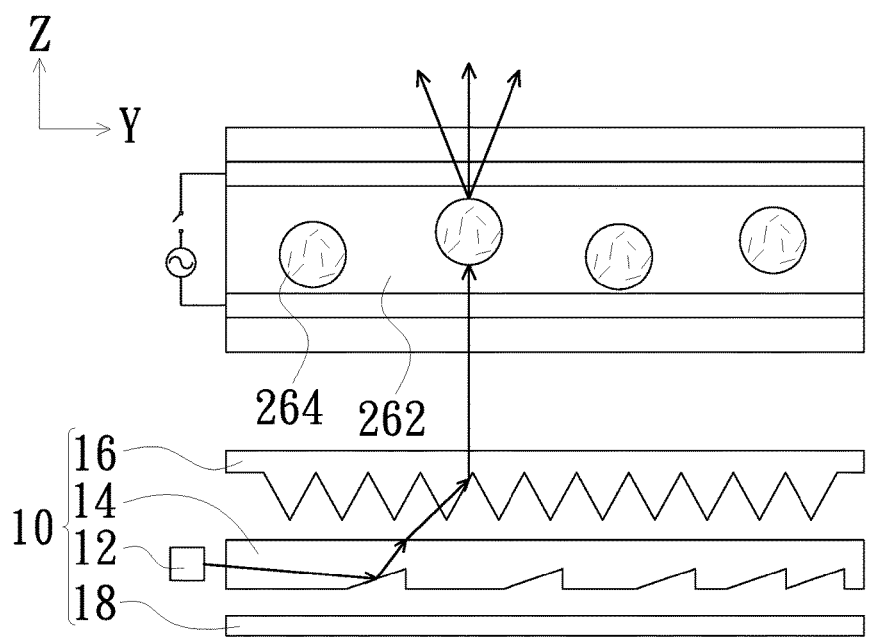
FIG. 6B is a schematic diagram of an optical path of the display device of FIG. 1 viewed from Y-Z plane when a switchable single-axis diffuser is switched to a diffusion mode.

Referring to FIGS. 6A and 6B, FIG. 6A is a schematic diagram of an optical path of the display device 100 viewed from X-Z plane when a switchable single-axis diffuser is switched to a diffusion mode, and FIG. 6B is a schematic diagram of an optical path of the display device 100 viewed from Y-Z plane when a switchable single-axis diffuser is switched to a diffusion mode. When no voltage difference is generated between the first transparent conductive layer 22 and the second transparent conductive layer 24, the liquid crystal of the liquid crystal droplets 264 are arranged irregularly so that the polymer dispersed liquid crystal layer is switched to the diffusion mode, and the emitting light from the backlight module 10 passing through the polymer dispersed liquid crystal layer 26 is diffused to the second light distribution pattern. In this embodiment, as the shape of each of the liquid crystal droplets 264 is ellipsoid, the diffusion angle in a direction along the long axis of the ellipsoid is wider than the diffusion angles in other directions. Since the long axis of the liquid crystal droplets 264 is parallel to the first direction (parallel to the X direction of FIG. 6A), the diffusion angle in the first direction is wider than the diffusion angles in other directions.

Figure 7A:
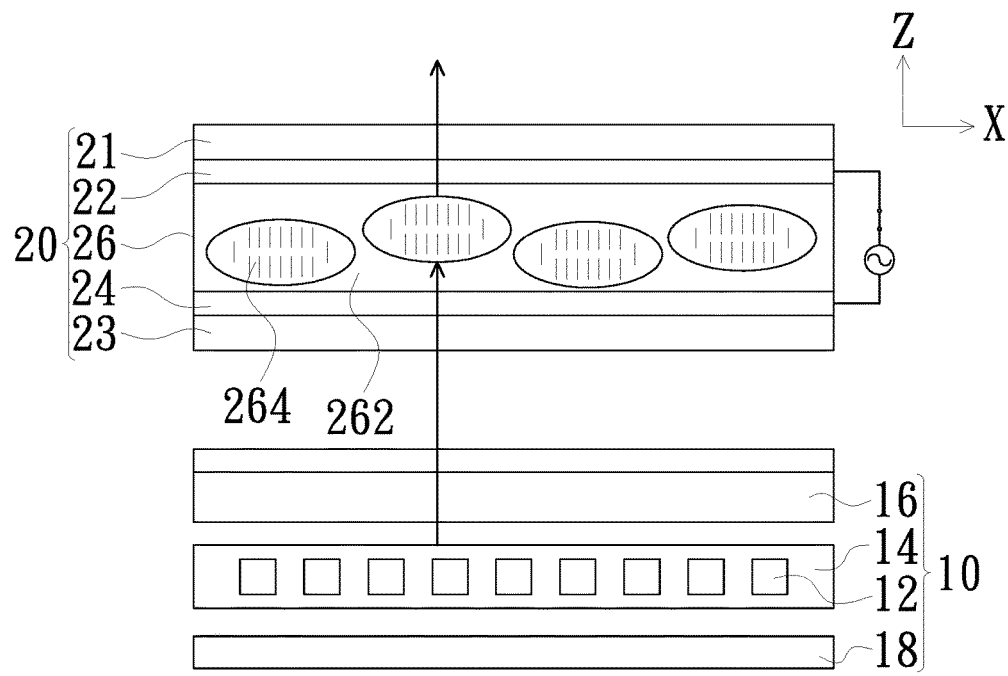
FIGS. 7A and 7B are schematic diagrams of the display device of FIG. 1 when a switchable single-axis diffuser is switched to a transparent mode.
Figure 7B:
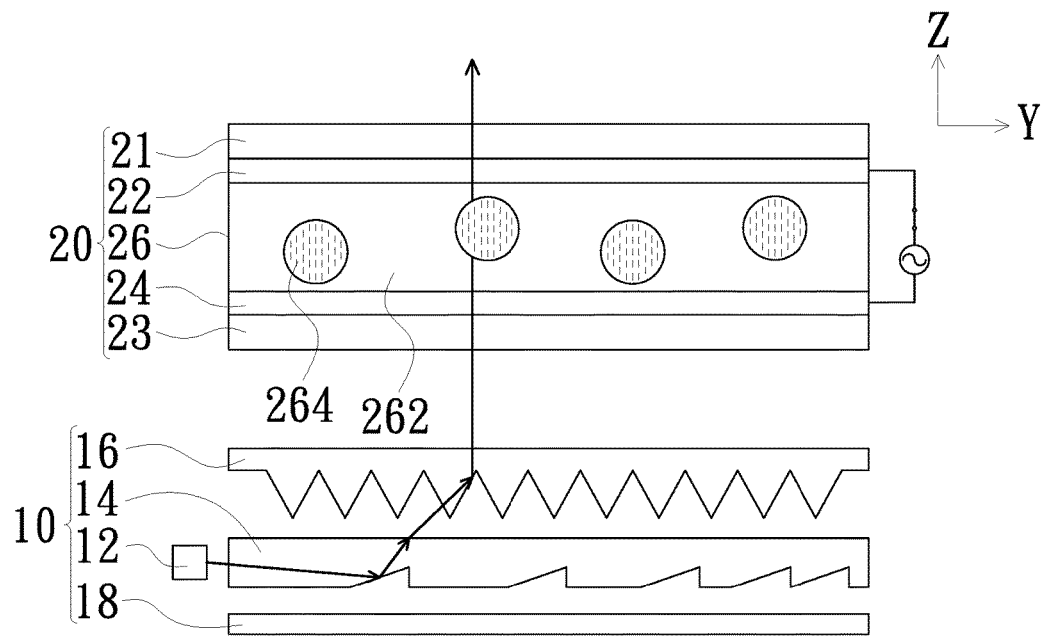

Referring to FIGS. 7A and 7B, FIG. 7A is a schematic diagram of an optical path of the display device 100 viewed from X-Z plane when a switchable single-axis diffuser is switched to a transparent mode, and FIG. 7B is a schematic diagram of an optical path of the display device 100 viewed from Y-Z plane when a switchable single-axis diffuser is switched to a transparent mode. When a voltage difference is generated between the first transparent conductive layer 22 and the second transparent conductive layer 24, liquid crystals of the liquid crystal droplets 264 are arranged regularly so that the polymer dispersed liquid crystal layer 26 is switched to the transparent mode. The emitting light from the backlight module 10 passing through the polymer dispersed liquid crystal layer 26 is maintained the first light distribution pattern.

The display device 100 of the invention concentrates the emitting light from the backlight module 100 in a narrower range to increase luminous intensity through the switchable single-axis diffuser 20 so that the displayed images become visible in the environment of strong external light. In the environment of weak external light, the emitting light from the backlight module 10 is distributed evenly in a wider view angle range in a specific direction for a user viewing the displayed images in the view angle range. As most light is diffused in a specific direction, it provides a higher luminous intensity in this specific direction. The switchable single-axis diffuser provides a diffusion angle in the first direction larger than diffusion angles in other directions so that light originally diffusing in other directions is concentrated to the normal direction and thus a higher luminous intensity is obtained in the first direction. Compared with other typical diffuser, the switchable single-axis diffuser of the invention provides a higher luminous intensity in the first direction.

In addition to the change of view angle range, the switchable single-axis diffuser 20 of the invention also provides privacy protection for the display device of the invention.

Figure 8:
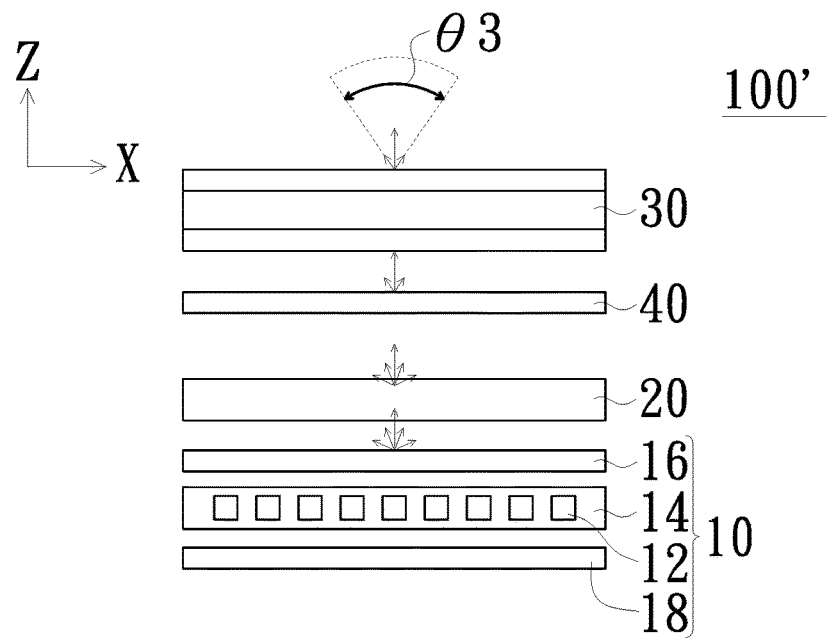
FIG. 8 is a schematic diagram of another embodiment of the display device of the invention, wherein the switchable single-axis diffuser is switched to a transparent mode.
Figure 9:
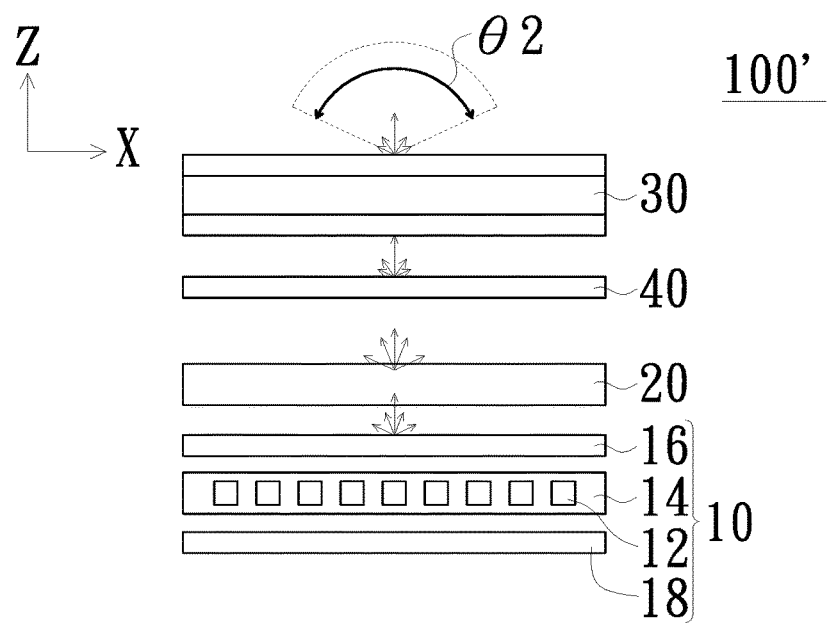
FIG. 9 depicts the display device of FIG. 8, wherein the switchable single-axis diffuser is switched to a diffusion mode.

Referring to FIGS. 8 and 9, another embodiment of a display device of the invention is disclosed. The display device 100' has a structure similar to the structure of the display device 100. The elements identical to the elements of the display device 100 are given the same number, and the descriptions for the elements are thus omitted. The display device 100' includes the backlight module 10, the switchable single-axis diffuser 20 and the display panel 30. The display device 100' further includes a semi-transparent view-angle-limiting filter 40 disposed on the backlight module 10 disposed in an optical path of the backlight module 10, the switchable single-axis diffuser 20 and the display panel 30. For example, the semi-transparent view-angle-limiting filter 40 is disposed between the switchable single-axis diffuser 20 and the display panel 30, or disposed on the display panel 30. The light transmittance of the semi-transparent view-angle-limiting filter 40 is gradually decreased along a normal line of the semi-transparent view-angle-limiting filter 40 toward the first direction. The light transmittance exceeds a preset value within a third view angle range θ3, and the preset value ranges from 40% to 60% in this embodiment.

The third view angle range θ3 is wider than the first view angle range θ1 and narrower than the second view angle range θ2 (referring to FIG. 2). As illustrated in FIG. 8, when the switchable single-axis diffuser 20 is switched to the transparent mode, after the light which has passed through the switchable single-axis diffuser 20 passes through the semi-transparent view-angle-limiting filter 40, the light is filtered by the semi-transparent view-angle-limiting filter 40 to have different luminous intensity in different exiting angles due to different light transmittances of the semi-transparent view-angle-limiting filter 40 in different angles. The light beyond the third view angle range θ3 has luminous intensity under a critical value and thus becomes invisible. As illustrated in FIG. 9, when the switchable single-axis diffuser 20 is switched to the diffusion mode, after the light which has passed through the switchable single-axis diffuser 20 passes through the semi-transparent view-angle-limiting filter 40, the light is filtered by the semi-transparent view-angle-limiting filter 40 to have different luminous intensity in different exiting angles due to different light transmittances of the semi-transparent view-angle-limiting filter 40 in different angles. The light within the second view angle range θ2 has luminous intensity exceeding a critical value and thus becomes visible.

The privacy protection angle is defined as the ratio of the luminous intensity (nits) at the privacy protection angle to the luminous intensity (nits) at the center view angle to be not exceeding 1.5% under the condition that the environment luminous intensity ranging 300 to 750 Lux (for example the luminous intensity of an ordinary office or conference room). At this time, the displayed images cannot be seen by an observer beyond the privacy protection angle, and it is defined as invisible. If the observer clearly views the displayed images when the ratio of the luminous intensity (nits) at the privacy protection angle to the luminous intensity (nits) at the center view angle exceeds 1.5%, it is defined as visible. However, in other more strict definitions of the privacy protection angle, the privacy protection angle is defined as the ratio of the luminous intensity (nits) at the privacy protection angle to the luminous intensity (nits) at the center view angle not exceeding 1% or 0.8%. Therefore, the definition of the privacy protection angle depends on requirements, and the privacy protection angle is set to be 45° in most conditions. Only in few conditions, the privacy protection angle is set to be 30°. The center view angle is defined as 0° or closed to 0° and has the highest luminous intensity. The measurement for luminous intensity can be performed by the instrument Conoscope or instrument BM7 or PR650 cooperated with rotatable arm.

Figure 10:
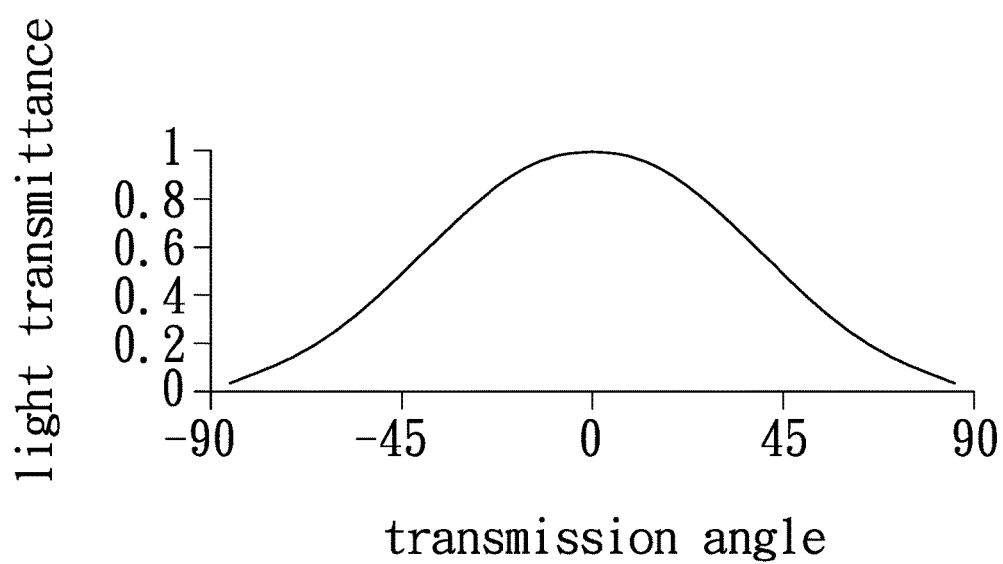
FIG. 10 is a curve diagram of transmission angle versus transmittance of a semi-transparent view-angle-limiting filter of the display device of FIG. 8.

As illustrated in FIG. 10, the light transmittance of the semi-transparent view-angle-limiting filter 40 is reduced under 50% beyond the angular range of ±45°. In this embodiment, the third view angle range θ3 is ±45°, and the light transmittance is 50%. The emitting light of the backlight module 10 has the first light distribution pattern. The first light distribution pattern as mentioned has luminous intensity exceeding 50% of the maximal value of luminous intensity of the emitting light within the first view angle range θ1 (±20°). The luminous intensity beyond the first view angle range θ1 (±20°) is less than 50% of the maximal value of luminous intensity of the emitting light. When the switchable single-axis diffuser 20 is switched to the transparent mode, the emitting light from the backlight module 10 passing through the switchable single-axis diffuser 20 is maintained to the first light distribution pattern. Because the light transmittance of the semi-transparent view-angle-limiting filter 40 beyond the third view angle range θ3 (±45°)

is reduced to be less than 50% and the third view angle range θ3 is wider than the first view angle range θ1, the luminous intensity of the emitting light beyond the third view angle range θ3 is reduced to be invisible when the emitting light of the first light distribution pattern passes through the semi-transparent view-angle-limiting filter 40 so that the semi-transparent view-angle-limiting filter 40 provides the privacy protection function. When the switchable single-axis diffuser 20 is switched to the diffusion mode, the luminous intensity of the emitting light which has passed through the switchable single-axis diffuser 20 becomes more average in the second view angle range θ2 through diffusion effect of the switchable single-axis diffuser 20. Since the second view angle range θ2 is wider than the third view angle range θ3, the luminous intensity of the emitting light beyond the third view angle range θ3 is still sufficient high to become visible even if the transmittance of the semi-transparent view-angle-limiting filter 40 beyond the third view angle range θ3 (±45°) is reduced to be less than 50%. Therefore, the display device 100' is switched between a privacy protection mode and a public mode through the switchable single-axis diffuser 20 switching between the transparent mode and the diffusion mode. The structure of the semi-transparent view-angle-limiting filter 40 is described as follows.

Figure 11:
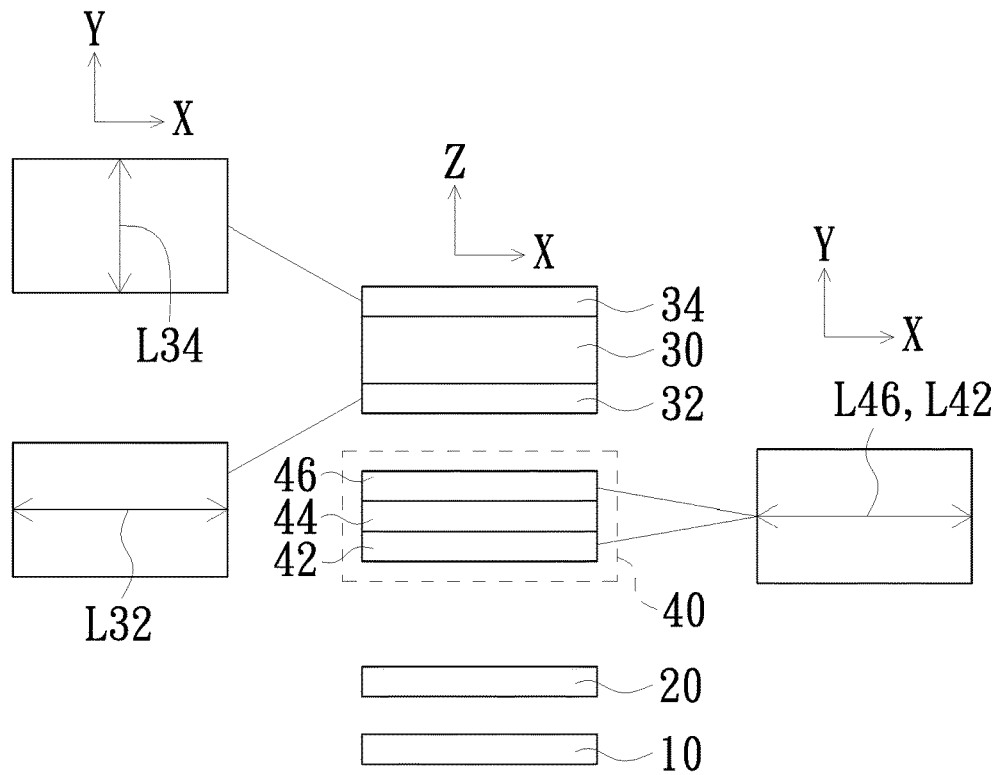
FIG. 11 is a schematic diagram of an embodiment of the semi-transparent view-angle-limiting filter of the display device of FIG. 8.
Figure 12:
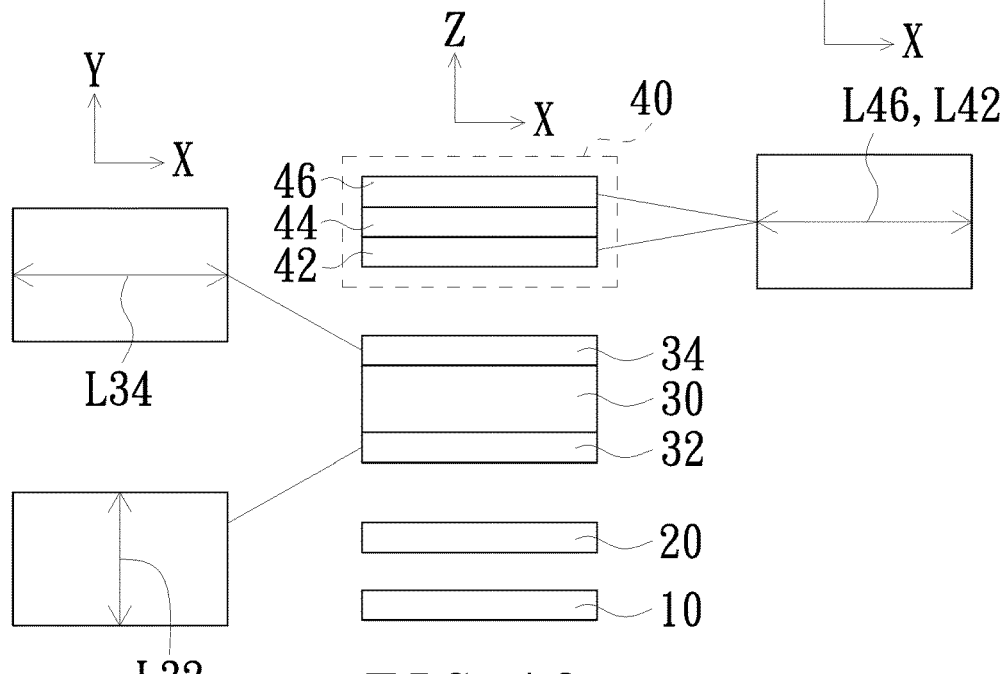
FIG. 12 is a schematic diagram of another embodiment of the semi-transparent view-angle-limiting filter of the display device of FIG. 8.

Referring to FIGS. 11 and 12, an embodiment of the semi-transparent view-angle-limiting filter of the invention is disclosed. FIG. 11 illustrates that the semi-transparent view-angle-limiting filter 40 is disposed between the switchable single-axis diffuser 20 and the display panel 30, and FIG. 12 illustrates that the semi-transparent view-angle-limiting filter 40 is disposed on the display panel 30, that is the display panel 30 is disposed between the semi-transparent view-angle-limiting filter 40 and the switchable single-axis diffuser 20. The semi-transparent view-angle-limiting filter 40 of the invention includes a first polarizer 42, a second polarizer 46 and a first phase retardation membrane 44 sandwiched between the first polarizer 42 and the second polarizer 46. The first polarizer 42 has a first transmission axis L42, and the second polarizer 46 has a second transmission axis L46. The first transmission axis L42 is parallel to the second transmission axis L46. The first phase retardation membrane 44 has a first liquid crystal polymer layer. Liquid crystal polymer of the first liquid crystal polymer layer has a first optical axis. The first optical axis is inclined with respect to the first polarizer 42 and the second polarizer 46, and the first optical axis has a first projection on the first polarizer 42 and the second polarizer 46 axially parallel or perpendicular to the first transmission axis L42 and the second transmission axis L46, and the first projection is axially perpendicular to the first direction. The emitting light passing through the first polarizer 42 and the first phase retardation membrane 44 has phase retardation, and the larger is the incident angle of the emitting light, the more is the phase retardation and more emitting light is absorbed by the second polarizer 46, whereby the transmittance of the semi-transparent view-angle-limiting filter 40 beyond the view angle range of ±45° in the first direction is reduced to be less than 50%. A polarizer 34 and a polarizer 32 are disposed above and under the display panel 30 respectively. The polarizer 34 has a transmission axis L34, and the polarizer 32 has a transmission axis L32. The transmission axis L32 is perpendicular to the transmission axis L34. In the structure illustrated in FIG. 11, the transmission axis L32 of the polarizer 32 is parallel to the transmission axis L46 of the second polarizer 46. In the structure illustrated in FIG. 12, the transmission axis L34 of the polarizer 34 is parallel to the transmission axis L42 of the first polarizer 42. That is the polarizer of the semi-transparent view-angle-limiting filter 40 must have a transmission axis parallel to the transmission axis of the adjacent polarizer on the display panel 30. When two overlapped polarizers have transmission axes of the same direction, they have the same effect as only one polarizer having a transmission axis of the same direction. Therefore, the second polarizer 46 of FIG. 11 and the first polarizer 42 of FIG. 12 can be omitted.

Figure 13:
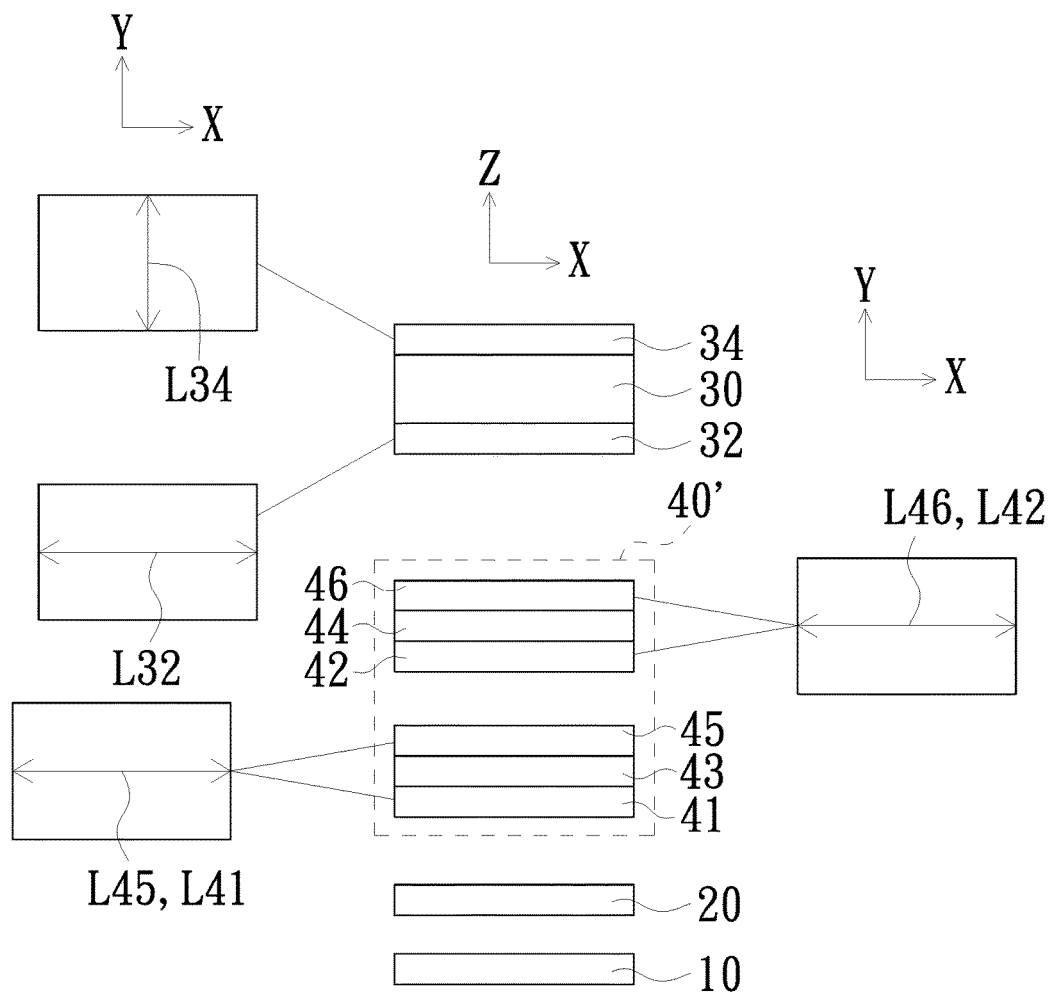
FIG. 13 is a schematic diagram of another embodiment of the semi-transparent view-angle-limiting filter of the display device of FIG. 8.
Figure 14:
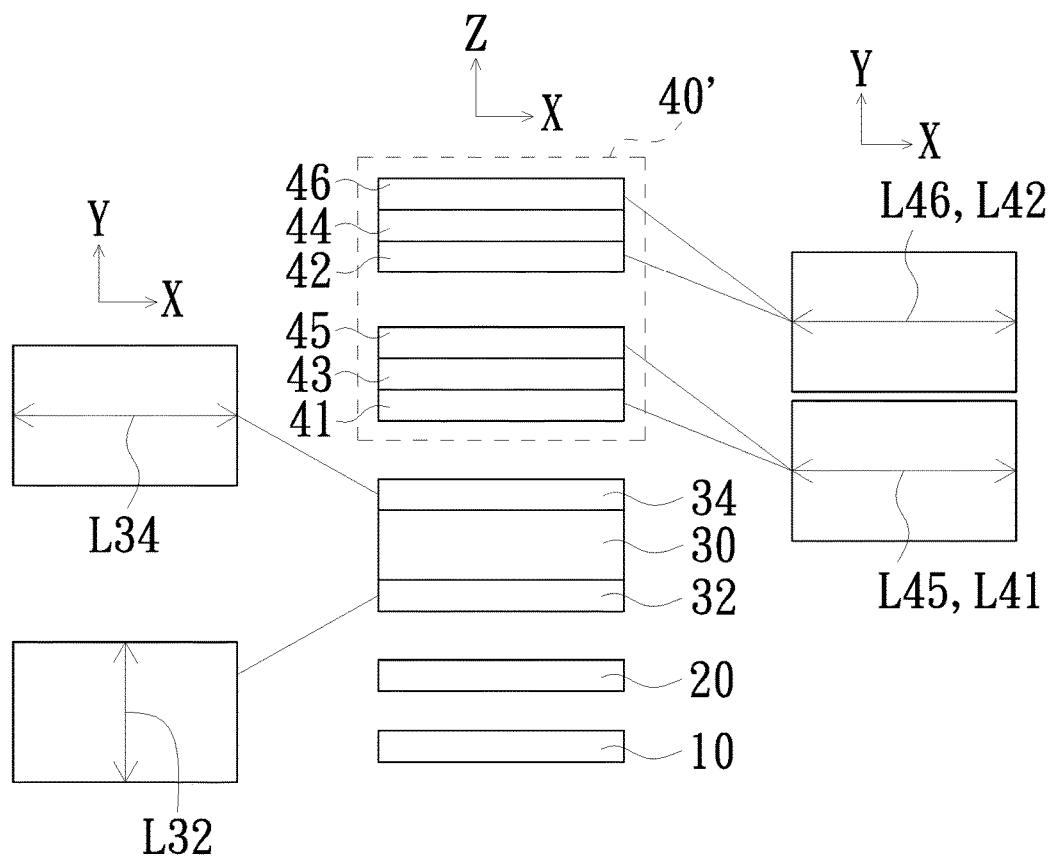
FIG. 14 is a schematic diagram of another embodiment of the semi-transparent view-angle-limiting filter of the display device of FIG. 8.

Referring to FIGS. 13 and 14, another embodiment of the semi-transparent view-angle-limiting filter of the invention is disclosed. FIG. 13 illustrates that the semi-transparent view-angle-limiting filter 40' is disposed between the switchable single-axis diffuser 20 and the display panel 30, and FIG. 14 illustrates that the semi-transparent view-angle-limiting filter 40' is disposed on the display panel 30, that is the display panel 30 is disposed between the semi-transparent view-angle-limiting filter 40' and the switchable single-axis diffuser 20. The semi-transparent view-angle-limiting filter 40' has a structure similar to the structure of the semi-transparent view-angle-limiting filter 40 illustrated in FIGS. 11 and 12. Therefore, the same numbers are given to the same elements, and the description of the same elements are thus omitted. The semi-transparent view-angle-limiting filter 40' includes the first polarizer 42, the second polarizer 46 and the first phase retardation membrane 44. In this embodiment, the semi-transparent view-angle-limiting filter 40' further includes a second phase retardation membrane 43, a third polarizer 41 and a polarizer 45. The second phase retardation membrane 43 is disposed between the first polarizer 42 and the third polarizer 41. The third polarizer 41 has a third transmission axis L41. The second phase retardation membrane 43 includes a second liquid crystal polymer layer. Liquid crystal polymer of the second liquid crystal polymer layer has a second optical axis perpendicular to a surface of the second phase retardation membrane 43. The third transmission axis L41 is parallel to the first transmission axis L42 and the second transmission axis L46. In this embodiment, the second phase retardation membrane 43 is disposed between the third polarizer 41 and the polarizer 45. The third transmission axis L41 of the third polarizer 41 is parallel to the transmission axis L45 of the polarizer 45. The third transmission axis L41 is parallel to the first transmission axis L42 and the second transmission axis L46. The second phase retardation membrane 43 enables the light transmittance for the emitting light to be less than 50% at angles of 45°, 135°, 225° and 315° with respect to the first direction beyond the angular range of ±45°. Therefore, when the emitting light passes through the first phase retardation membrane 44 and the second phase retardation membrane 43, the phase retardation occurs in the first direction and the directions of 45°, 135°, 225° and 315° with respect to the first direction so that the light transmittance for emitting light in the first direction and the directions of 45°, 135°, 225° and 315° with respect to the first direction is reduced to be less than 50%. In addition, since the first transmission axis L42 of the first polarizer 42 is parallel to the transmission axis L45 of the polarizer 45 in the structure illustrated in FIGS. 13 and 14, the first polarizer 42 or the polarizer 45 can be omitted.

In another embodiment, the semi-transparent view-angle-limiting filter further includes a third phase retardation membrane and a fourth polarizer. That is the second phase retardation membrane 43 and the third polarizer 41 of FIGS. 13 and 14 are replaced by the third phase retardation membrane and the fourth polarizer. As they have the same structures, the figures of the third phase retardation membrane and the fourth polarizer are thus omitted. The third phase retardation membrane is disposed between the first polarizer and the fourth polarizer. The fourth polarizer has a fourth transmission axis. The third phase retardation membrane includes a third liquid crystal polymer layer. Liquid crystal polymer of the third liquid crystal polymer layer has a third optical axis. The third optical axis has a projection on the second polarizer and the fourth polarizer is parallel or perpendicular to the second transmission axis and the fourth transmission axis. The fourth transmission axis is parallel to the first transmission axis and the second transmission axis. The first phase retardation membrane 44 has phase retardation properties different from that of the third phase retardation membrane. The difference between this embodiment and the embodiment illustrated by FIGS. 13 and 14 is that the third phase retardation membrane has a structure similar to that of the first phase retardation membrane 44. The liquid crystal polymer of them has inclined optical axis, but their liquid crystal polymers have different properties. The phase retardation depends on the product of refractive index difference and the thickness of liquid crystal polymers. When the product of the refractive index difference and the thickness is different, the phase retardation is thus different. In this embodiment, as the optical axis of the liquid crystal polymer is inclined, the direction of the optical axis also affects the phase retardation. The first phase retardation membrane 44 and the third phase retardation membrane causes different phase retardation through liquid crystal polymer of different properties therein and reduce the light transmittance for the emitting light to be less than 50% beyond the angular range ±45° in the first direction.

Figure 15:
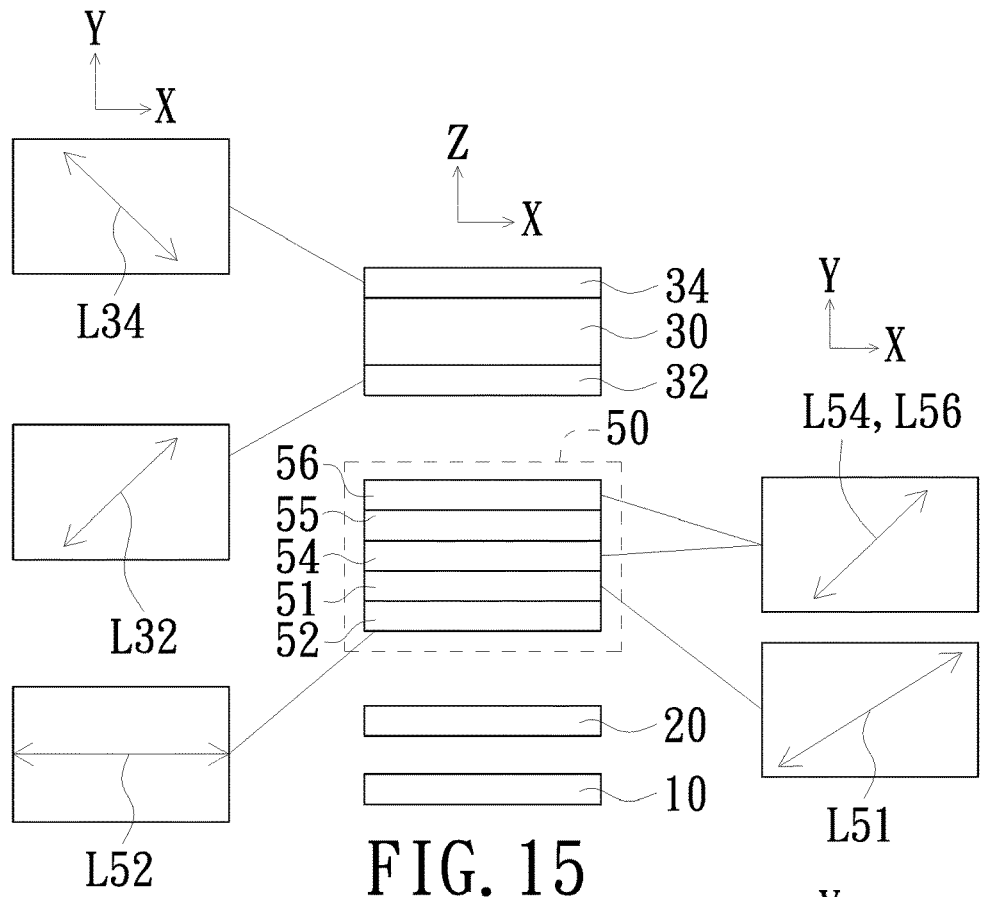
FIG. 15 is a schematic diagram of another embodiment of the semi-transparent view-angle-limiting filter of the display device of FIG. 8.
Figure 16:
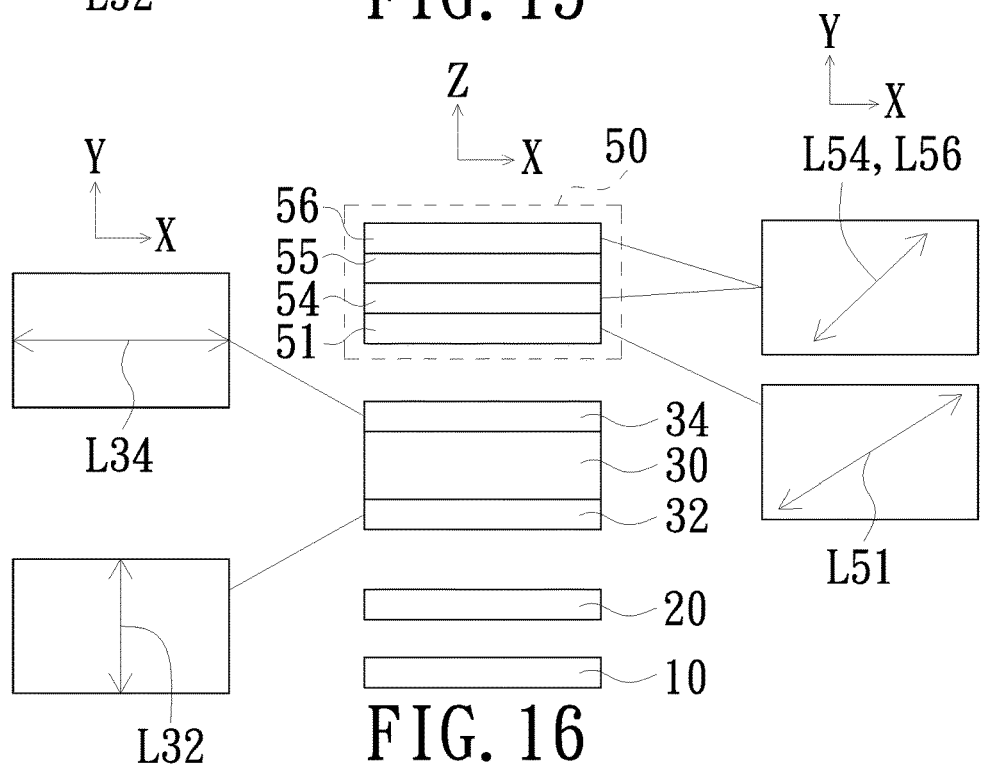
FIG. 16 is a schematic diagram of another embodiment of the semi-transparent view-angle-limiting filter of the display device of FIG. 8.

Referring to FIGS. 15 and 16, another embodiment of the semi-transparent view-angle-limiting filter of the invention is disclosed. FIG. 15 illustrates that the semi-transparent view-angle-limiting filter 50 is disposed between the switchable single-axis diffuser 20 and the display panel 30, and FIG. 16 illustrates that the semi-transparent view-angle-limiting filter 50 is disposed on the display panel 30, that is the display panel 30 is disposed between the semi-transparent view-angle-limiting filter 50 and the switchable single-axis diffuser 20. The semi-transparent view-angle-limiting filter 50 includes a fifth polarizer 52, a sixth polarizer 56, a half wave plate 51 and a fourth phase retardation membrane 55. The fifth polarizer 52 has a fifth transmission axis L52, and the sixth polarizer 56 has a sixth transmission axis L56. The half wave plate 51 and the fourth phase retardation membrane 55 are located between the fifth polarizer 52 and the sixth polarizer 56, and the fourth phase retardation membrane 55 includes a fourth liquid crystal polymer layer. Liquid crystal polymer of the fourth liquid crystal polymer layer has a fourth optical axis perpendicular to a surface of the fourth phase retardation membrane 55. The half wave plate 51 has a slow axis L51. The slow axis L51 and the fifth transmission axis L52 form an angle of 22.5°±15° or 62.5°±15°, and the sixth transmission axis L56 and the fifth transmission axis L52 form an angle of 45.5°±15° or 125°±15°. The fourth phase retardation membrane 55 enables the light transmittance for the emitting light to be less than 50% at angles of 45°, 135°, 225° and 315° with respect to the first direction beyond the view angle range of ±45°. When the fourth phase retardation membrane 55 is cooperated with the half wave plate 51, the phase retardation changes the direction, in which the light transmittance for the emitting light is less than 50%, back to the first direction. A polarizer 54 is disposed between the fourth phase retardation membrane 55 and the half wave plate 51. The polarizer 54 has a transmission axis L54 parallel to the sixth transmission L56 of the sixth polarizer 56. In the structure illustrated by FIG. 15, as the sixth transmission axis L56 of the sixth polarizer 56 is parallel to the transmission axis L32 of the polarizer 32, one of the sixth polarizer 56 and the polarizer 32 can be omitted. In the structure illustrated by FIG. 16, as the fifth transmission axis L52 (not shown) of the fifth polarizer 52 (not shown) is parallel to the transmission axis L34 of the polarizer 34 of the display panel 30, so the fifth polarizer 52 can be omitted.

Figure 17:
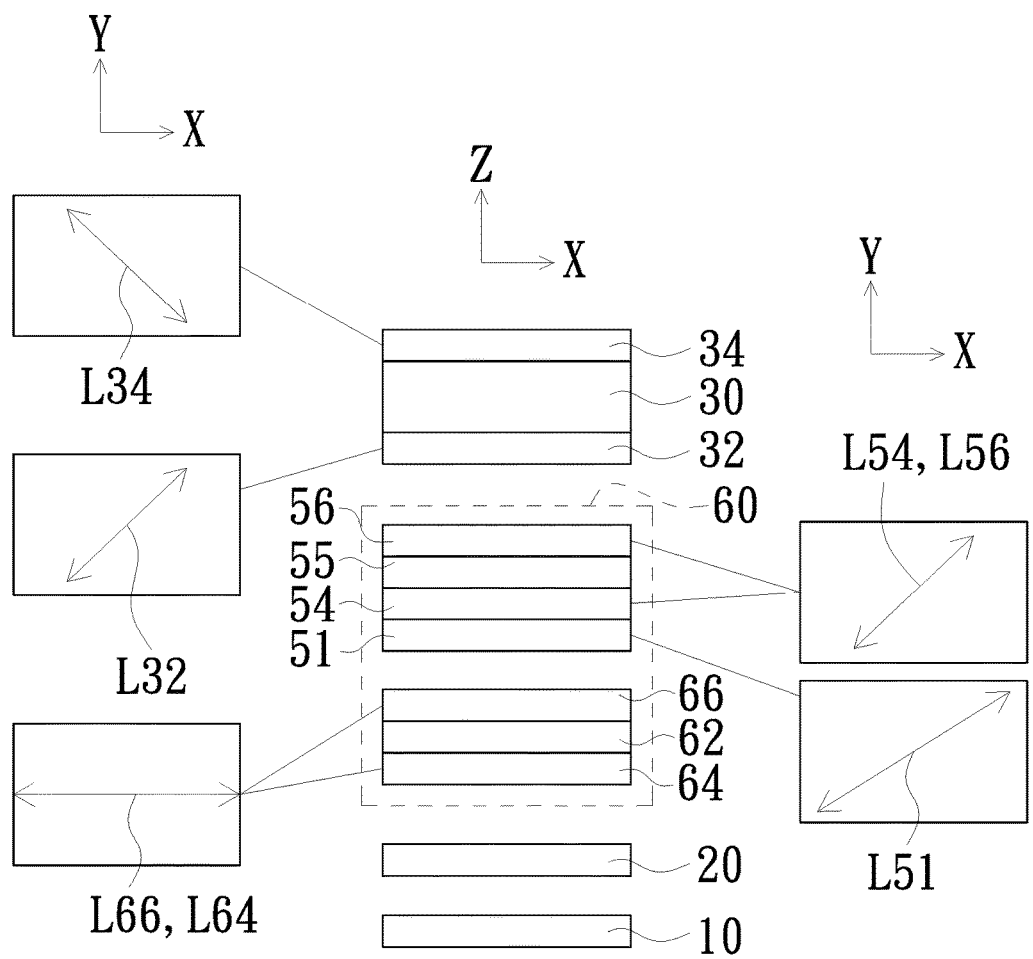
FIG. 17 is a schematic diagram of another embodiment of the semi-transparent view-angle-limiting filter of the display device of FIG. 8.
Figure 18:
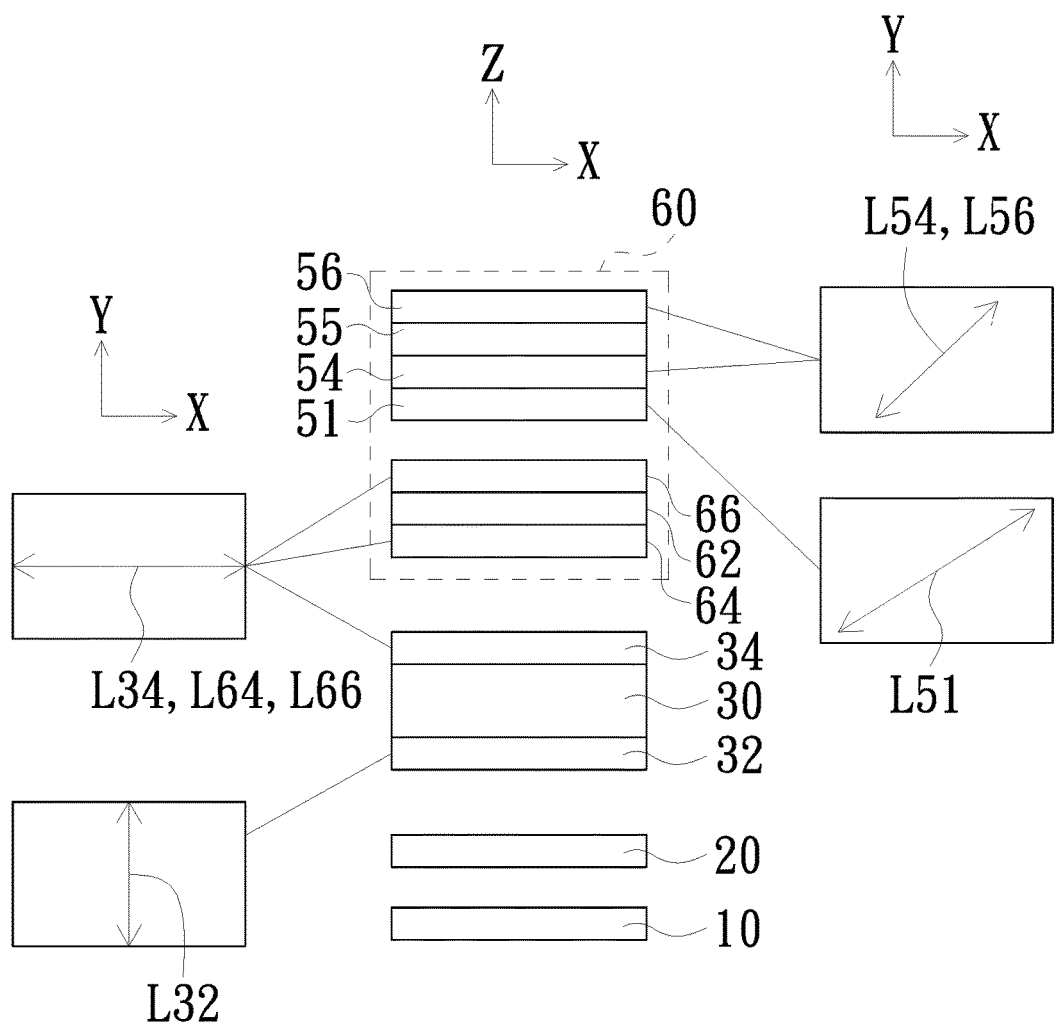
FIG. 18 is a schematic diagram of another embodiment of the semi-transparent view-angle-limiting filter of the display device of FIG. 8.

Referring to FIGS. 17 and 18, another embodiment of the semi-transparent view-angle-limiting filter is disclosed. FIG. 17 illustrates that the semi-transparent view-angle-limiting filter 60 is disposed between the switchable single-axis diffuser 20 and the display panel 30, and FIG. 18 illustrates that the semi-transparent view-angle-limiting filter 60 is disposed on the display panel 30, that is the display panel 30 is disposed between the semi-transparent view-angle-limiting filter 60 and the switchable single-axis diffuser 20. The semi-transparent view-angle-limiting filter 60 has a structure similar to the structure of the semi-transparent view-angle-limiting filter 40 illustrated in FIGS. 15 and 16. Therefore, the same numbers are given to the same elements, and the description of the same elements are thus omitted. The semi-transparent view-angle-limiting filter 60 includes the polarizer 54, the sixth polarizer 56, the half wave plate 51 and the fourth phase retardation membrane 55. In this embodiment, the semi-transparent view-angle-limiting filter 60 further includes a fifth phase retardation membrane 62. The half wave plate 51 is disposed between the fourth phase retardation membrane 55 and the fifth phase retardation membrane 62. The fifth phase retardation membrane 62 includes a fifth liquid crystal polymer layer having a fifth optical axis. The fifth optical axis is perpendicular to a surface of the fifth phase retardation membrane 62. The semi-transparent view-angle-limiting filter 60 further includes a polarizer 64 and a polarizer 66. The polarizer 64 has a transmission axis L64, and the polarizer 66 has a transmission axis L66. The transmission axis L64 is parallel to the transmission axis L66. In the structure illustrated in FIG. 18, as the transmission axis L64 is parallel to the transmission axis L34 of the polarizer 34 of the display panel 30, so the polarizer 66 can be omitted.

In another embodiment, the semi-transparent view-angle-limiting filter includes a seventh polarizer, an eighth polarizer, a ninth polarizer, a sixth phase retardation membrane and a seventh phase retardation membrane. The structure of the semi-transparent view-angle-limiting filter of this embodiment is similar to the structure illustrated in FIGS. 13 and 14, and the figures of this embodiment are thus omitted. The seventh polarizer has a seventh transmission axis, the eighth polarizer has an eighth transmission axis and the ninth polarizer has a ninth transmission axis. The sixth phase retardation membrane is disposed between the seventh polarizer and the eighth polarizer. The seventh phase retardation membrane is disposed between the eighth polarizer and the ninth polarizer. The sixth phase retardation membrane includes a sixth liquid crystal polymer layer having a sixth optical axis, and the sixth optical axis is perpendicular to a surface of the sixth phase retardation membrane. The seventh phase retardation membrane includes a seventh liquid crystal polymer layer having a seventh optical axis, and the seventh optical axis is perpendicular to a surface of the seventh phase retardation membrane. The seventh transmission axis, the eighth transmission axis and the ninth transmission axis are parallel and have an angle of 45.5°±15° or 125°±15° with respect to the first direction. The sixth phase retardation membrane has phase retardation properties different from that of the seventh phase retardation membrane. The difference between this embodiment and the embodiment of FIGS. 13 and 14 is that the sixth optical axis is perpendicular to the sixth phase retardation membrane, and the seventh optical axis is perpendicular to the seventh phase retardation membrane. As mentioned above, the phase retardation depends on the product of refractive index difference and the thickness of liquid crystal polymers. When the product of the refractive index difference and the thickness is different, the phase retardation is thus different. The sixth phase retardation membrane and the seventh phase retardation membrane causes different phase retardation through filling with liquid crystal polymer of different properties therein and reduce the transmittance for the emitting light to be less than 50% beyond the angular range ±45° in the first direction.

Figure 19:
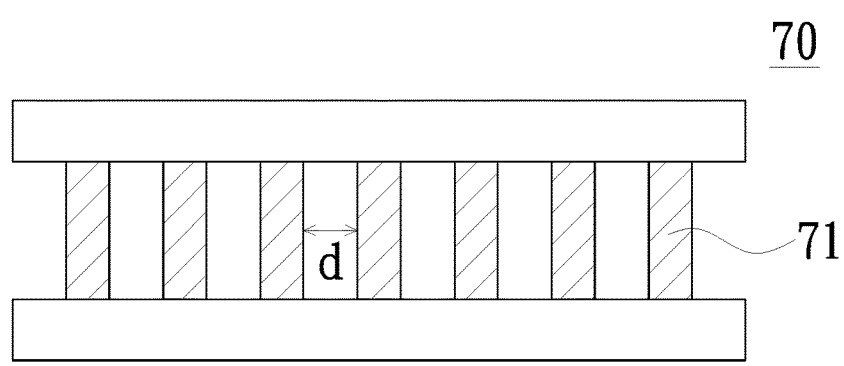
FIG. 19 is a schematic diagram of a semi-transparent view-angle-limiting filter including a plurality of semi-transparent partition walls.

Referring to FIG. 19, FIG. 19 is a schematic diagram of a semi-transparent view-angle-limiting filter including a plurality of semi-transparent partition walls. In this embodiment, the semi-transparent view-angle-limiting filter 70 includes a plurality of partition walls 71 arranged along the first direction. A predetermined gap d is formed between two adjacent partition walls 71 of the partition walls 71, and the predetermined gap d serves as an optical passage. The partition walls 71 includes a gray photo resistance, dye or pigment, and the partition walls 71 have light transmittance ranging from 10% to 60%, and preferably ranging from 40% to 50%, and the most preferably being 50%. Thus, the transmittance for the emitting light beyond the view angle range ±45° on the first direction is less than 50%.

The display device 100' of the present invention is switched between the privacy protection mode and the public mode through the semi-transparent view-angle-limiting filter 40, 40', 50, 60 and 70 cooperated with the switchable single-axis diffuser 20 switched between the transparent mode and the diffusion mode.

The display device 100 of the present invention utilizes the backlight light of condensation type and the switchable single-axis diffuser 20 which is switched between the transparent mode and the diffusion mode. In an environment of strong external light, the switchable single-axis diffuser 20 is switched to the transparent mode to concentrate the emitting light in a view angle range to obtain a higher luminous intensity and display images clearly. In an environment of a weak external light, the switchable single-axis diffuser 20 is switched to the diffusion mode to increase the view angle range and reduce the luminous intensity, but the displayed image is still clearly viewed by a user. Therefore, it is not necessary to add additional light sources or increase the current driving light sources for the display device 100 of the present invention. The switchable single-axis diffuser 20 is used to response the external light and adjusts the luminous intensity of the display device 100.

In addition, the display device 100 further includes the semi-transparent view-angle-limiting filter 40 reducing the luminous intensity to a preset value beyond a predetermined view angle range. The semi-transparent view-angle-limiting filter 40 cooperates with the switchable single-axis diffuser 20 switched between transparent mode and the diffusion mode to provide privacy protection function for the display device 100' and switch between the privacy protection and the public mode.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first stop part, the second stop part, the first ring part and the second ring part are only used for distinguishing various elements and do not limit the number of the elements.

What is claimed is:

1. A display device, comprising:
   a backlight module configured to generate an emitting light having a first light distribution pattern which has a luminous intensity exceeding a predetermined value within a first view angle range in a first direction;
   a switchable diffuser disposed on the backlight module and switchable between a transparent mode and a diffusion mode, wherein the emitting light passing through the switchable diffuser has a diffusion angle in the first direction greater than diffusion angles in other directions in a case the switchable diffuser is switched to the diffusion mode;
   a display panel disposed on the switchable diffuser, wherein the emitting light passes through the switchable diffuser and the display panel to generate an image, the emitting light passes through the switchable diffuser and is maintained to the first light distribution pattern in a case the switchable diffuser is switched to the transparent mode, the emitting light passes through the switchable diffuser and is diffused to have a second light distribution pattern which has a luminous intensity exceeding the predetermined value within a second view angle range in the first direction, and the second view angle range is wider than the first view angle range; and a semi-transparent view-angle-limiting filter disposed in an optical path of the backlight module, the switchable diffuser and the display panel, wherein the semi-transparent view-angle-limiting filter has a light transmittance gradually decreased along a normal line of the semi-transparent view-angle-limiting filter toward the first direction, the light transmittance exceeds a pre-set value within a third view angle range, and the third view angle range is wider than the first view angle range and narrower than the second view angle range, wherein the semi-transparent view-angle-limiting filter comprises a first polarizer having a first transmission axis, a second polarizer having a second transmission axis parallel to the first transmission axis, and a first phase retardation membrane sandwiched between the first polarizer and the second polarizer, the first phase retardation membrane has a first liquid crystal polymer layer, liquid crystal polymer of the first liquid crystal polymer layer has a first optical axis, the first optical axis has a first projection on the first polarizer and the second polarizer axially parallel or perpendicular to the first transmission axis and the second transmission axis, and the first projection is axially perpendicular to the first direction, wherein the semi-transparent view-angle-limiting filter further comprises a second phase retardation membrane comprising a second liquid crystal polymer layer and a third polarizer having a third transmission axis, the second phase retardation membrane is located between the first polarizer and the third polarizer, liquid crystal polymer of the second liquid crystal polymer layer has a second optical axis perpendicular to a surface of the second phase retardation membrane, and the third transmission axis is parallel to the first transmission axis and the second transmission axis.

2. The display device according to claim 1, wherein the switchable diffuser comprises:
  a first transparent conductive layer;
  a second transparent conductive layer; and
  a polymer dispersed liquid crystal layer sandwiched between the first transparent conductive layer and the second transparent conductive layer, the polymer dispersed liquid crystal layer comprising a polymer substrate and a plurality of liquid crystal droplets disposed within the polymer substrate, the shape of each of the liquid crystal droplets having a long axis parallel to the first direction is ellipsoid, wherein in a case a voltage difference is generated between the first transparent conductive layer and the second transparent conductive layer, liquid crystals of the liquid crystal droplets are arranged regularly so that the polymer dispersed liquid crystal layer is switched to the transparent mode, and in a case no voltage difference is generated between the first transparent conductive layer and the second transparent conductive layer, the liquid crystal of the liquid crystal droplets are arranged irregularly so that the polymer dispersed liquid crystal layer is switched to the diffusion mode.

3. The display device according to claim 1, wherein the pre-set value ranges from 40% to 60%.

4. The display device according to claim 1, wherein the semi-transparent view-angle-limiting filter is disposed between the switchable diffuser and the display panel.

5. The display device according to claim 1, wherein the display panel is disposed between the semi-transparent view-angle-limiting filter and the switchable diffuser.

6. The display device according to claim 1, wherein the semi-transparent view-angle-limiting filter comprises a plurality of partition walls arranged along the first direction, a predetermined gap is formed between two adjacent partition walls of the partition walls, and the predetermined gap serves as an optical passage.

7. The display device according to claim 6, wherein the partition walls comprises gray photo resistance, dye or pigment, and the partition walls have transmittance ranging from 10% to 60%.

8. The display device according to claim 1, wherein the first view angle range is between +20° to −20°.

9. The display device according to claim 1, wherein the third view angle range is between +45° to −45°.

10. A display device, comprising:
  a backlight module configured to generate an emitting light having a first light distribution pattern which has a luminous intensity exceeding a predetermined value within a first view angle range in a first direction;
  a switchable diffuser disposed on the backlight module and switchable between a transparent mode and a diffusion mode, wherein the emitting light passing through the switchable diffuser has a diffusion angle in the first direction greater than diffusion angles in other directions in a case the switchable diffuser is switched to the diffusion mode;
  a display panel disposed on the switchable diffuser, wherein the emitting light passes through the switchable diffuser and the display panel to generate an image, the emitting light passes through the switchable diffuser and is maintained to the first light distribution pattern in a case the switchable diffuser is switched to the transparent mode, the emitting light passes through the switchable diffuser and is diffused to have a second light distribution pattern which has a luminous intensity exceeding the predetermined value within a second view angle range in the first direction, and the second view angle range is wider than the first view angle range; and
  a semi-transparent view-angle-limiting filter disposed in an optical path of the backlight module, the switchable diffuser and the display panel, wherein the semi-transparent view-angle-limiting filter has a light transmittance gradually decreased along a normal line of the semi-transparent view-angle-limiting filter toward the first direction, the light transmittance exceeds a pre-set value within a third view angle range, and the third view angle range is wider than the first view angle range and narrower than the second view angle range, wherein the semi-transparent view-angle-limiting filter comprises a first polarizer having a first transmission axis, a second polarizer having a second transmission axis parallel to the first transmission axis, and a first phase retardation membrane sandwiched between the first polarizer and the second polarizer, the first phase retardation membrane has a first liquid crystal polymer layer, liquid crystal polymer of the first liquid crystal polymer layer has a first optical axis, the first optical axis has a first projection on the first polarizer and the second polarizer axially parallel or perpendicular to the first transmission axis and the second transmission axis, and the first projection is axially perpendicular to the first direction, wherein the semi-transparent view-angle-limiting filter further comprises a third phase retardation membrane comprising a third liquid crystal polymer layer and a fourth polarizer having a fourth transmission axis, the third phase retardation membrane is located between the second polarizer and the fourth polarizer, liquid crystal polymer of the third liquid crystal polymer layer has a third optical axis which has a third projection on the second polarizer and the fourth polarizer parallel or perpendicular to the second transmission axis and the fourth transmission axis, the fourth transmission axis is parallel to the first transmission axis and the second transmission axis, and the first phase retardation membrane has phase retardation properties different from that of the third phase retardation membrane.

11. A display device, comprising:
a backlight module configured to generate an emitting light having a first light distribution pattern which has a luminous intensity exceeding a predetermined value within a first view angle range in a first direction;
a switchable diffuser disposed on the backlight module and switchable between a transparent mode and a diffusion mode, wherein the emitting light passing through the switchable diffuser has a diffusion angle in the first direction greater than diffusion angles in other directions in a case the switchable diffuser is switched to the diffusion mode;
a display panel disposed on the switchable diffuser, wherein the emitting light passes through the switchable diffuser and the display panel to generate an image, the emitting light passes through the switchable diffuser and is maintained to the first light distribution pattern in a case the switchable diffuser is switched to the transparent mode, the emitting light passes through the switchable diffuser and is diffused to have a second light distribution pattern which has a luminous intensity exceeding the predetermined value within a second view angle range in the first direction, and the second view angle range is wider than the first view angle range; and
a semi-transparent view-angle-limiting filter disposed in an optical path of the backlight module, the switchable diffuser and the display panel, wherein the semi-transparent view-angle-limiting filter has a light transmittance gradually decreased along a normal line of the semi-transparent view-angle-limiting filter toward the first direction, the light transmittance exceeds a pre-set value within a third view angle range, and the third view angle range is wider than the first view angle range and narrower than the second view angle range,
wherein the semi-transparent view-angle-limiting filter further comprises a fifth polarizer having a fifth transmission axis, a sixth polarizer having a sixth transmission axis, a half wave plate having a slow axis and a fourth phase retardation membrane comprising a fourth liquid crystal polymer layer, the half wave plate and the fourth phase retardation membrane are located between the fifth polarizer and the sixth polarizer, the liquid crystal polymer of the fourth liquid crystal polymer layer has a fourth optical axis perpendicular to a surface of the fourth phase retardation membrane, the slow axis and the fifth transmission axis form an angle of 22.5°±15° or 62.5°±15°, the sixth transmission axis and the fifth transmission axis form an angle of 45.5°±15° or 125°±15°,
wherein the semi-transparent view-angle-limiting filter further comprises a fifth phase retardation membrane, the half wave plate is disposed between the fourth phase retardation membrane and the fifth phase retardation membrane, the fifth phase retardation membrane comprises a fifth liquid crystal polymer layer, and liquid crystal polymer of the fifth liquid crystal polymer layer has an optical axis perpendicular to a surface of the fifth phase retardation membrane.

12. A display device, comprising:
a backlight module configured to generate an emitting light having a first light distribution pattern which has a luminous intensity exceeding a predetermined value within a first view angle range in a first direction;
a switchable diffuser disposed on the backlight module and switchable between a transparent mode and a diffusion mode, wherein the emitting light passing through the switchable diffuser has a diffusion angle in the first direction greater than diffusion angles in other directions in a case the switchable diffuser is switched to the diffusion mode;
a display panel disposed on the switchable diffuser, wherein the emitting light passes through the switchable diffuser and the display panel to generate an image, the emitting light passes through the switchable diffuser and is maintained to the first light distribution pattern in a case the switchable diffuser is switched to the transparent mode, the emitting light passes through the switchable diffuser and is diffused to have a second light distribution pattern which has a luminous intensity exceeding the predetermined value within a second view angle range in the first direction, and the second view angle range is wider than the first view angle range; and
a semi-transparent view-angle-limiting filter disposed in an optical path of the backlight module, the switchable diffuser and the display panel, wherein the semi-transparent view-angle-limiting filter has a light transmittance gradually decreased along a normal line of the semi-transparent view-angle-limiting filter toward the first direction, the light transmittance exceeds a pre-set value within a third view angle range, and the third view angle range is wider than the first view angle range and narrower than the second view angle range,
wherein the semi-transparent view-angle-limiting filter further comprises a seventh polarizer having a seventh transmission axis, an eighth polarizer having a eighth transmission axis, a ninth polarizer having a ninth transmission axis, a sixth phase retardation membrane comprising a sixth liquid crystal polymer layer and a seventh phase retardation membrane comprising a seventh liquid crystal polymer layer, the sixth phase retardation membrane is located between the seventh polarizer and the eighth polarizer, the seventh phase retardation membrane is located between the eighth polarizer and the ninth polarizer, liquid crystal polymer of the sixth liquid crystal polymer layer has a sixth optical axis perpendicular to a surface of the sixth phase retardation membrane, liquid crystal polymer of the seventh liquid crystal polymer layer has a seventh optical axis perpendicular to a surface of the seventh phase retardation membrane, the seventh transmission axis, the eighth transmission axis and the ninth transmission axis are parallel, and the sixth phase retardation membrane has phase retardation properties different from that of the seventh phase retardation membrane.

* * * * *